US006390544B1

United States Patent
Manders et al.

(10) Patent No.: US 6,390,544 B1
(45) Date of Patent: May 21, 2002

(54) OPEN ROOF CONSTRUCTION FOR A VEHICLE

(75) Inventors: Peter Christiaan Leonardus Johannes Manders, Horst; Marcel Johan Christiaan Nellen, Oostrum/Venray, both of (NL)

(73) Assignee: Inalfa Industries, B. V. (NL)

(*) Notice: Subject to any disclaimer, the term of this patent is extended or adjusted under 35 U.S.C. 154(b) by 0 days.

(21) Appl. No.: 09/553,689

(22) Filed: Apr. 21, 2000

(51) Int. Cl.[7] ............................. B60J 7/05; B60J 7/19
(52) U.S. Cl. ..................... 296/223; 296/221; 296/224
(58) Field of Search ................. 296/216.06–216.08, 296/221–224

(56) References Cited

U.S. PATENT DOCUMENTS

| | | | |
|---|---|---|---|
| 4,417,763 A | 11/1983 | Schlapp et al. | 296/216 |
| 4,619,480 A | 10/1986 | Motoyama et al. | 296/217 |
| 4,647,104 A | 3/1987 | Kohlpaintner et al. | 296/221 |
| 4,671,565 A | 6/1987 | Grimm et al. | 296/216 |
| 4,684,169 A * | 8/1987 | Igel et al. | 296/221 |
| 4,725,092 A * | 2/1988 | Reintges et al. | 296/221 |
| 4,752,099 A | 6/1988 | Roos et al. | 296/223 |
| 4,877,285 A * | 10/1989 | Huyer | 296/223 |
| 5,020,849 A | 6/1991 | Schlapp et al. | 296/221 |
| 5,058,947 A | 10/1991 | Huyer | 296/216 |
| 5,066,068 A | 11/1991 | Suzuki et al. | 296/221 |
| 5,259,662 A | 11/1993 | Huyer | 296/221 |
| 5,527,085 A | 6/1996 | Ochiai et al. | 296/223 |
| 5,593,204 A | 1/1997 | Wahl et al. | 296/223 |
| 5,845,959 A | 12/1998 | Ueki | 296/221 |
| 6,164,178 A | 12/2000 | Stallfort | 296/222 |

FOREIGN PATENT DOCUMENTS

| | | |
|---|---|---|
| DE | 3442600 A1 | 5/1986 |
| DE | 3603314 A1 | 6/1987 |
| DE | 3930756 | 3/1991 |
| DE | 9116412 U | 11/1993 |

(List continued on next page.)

OTHER PUBLICATIONS

U.S. application No. 09/556,192, filed Apr. 21, 2000.
U.S. application No. 09/556,110, filed Apr. 21, 2000.
U.S. application No. 09/530,004, filed Apr. 21, 2000.
U.S. application No. 09/616,168, filed Jul. 14, 2000.
U.S. application No. 09/661,231, filed Sep. 13, 2000.
U.S. application No. 09/616,172, filed Jul. 14, 2000.
U.S. application No. 09/616,559, filed Jul. 14, 2000.
"The Woodworkers' Store", 1993–94 Catalog.

Primary Examiner—Dennis H. Pedder
(74) Attorney, Agent, or Firm—Westman, Champlin & Kelly, P.A.; S. Koehler

(57) ABSTRACT

An open roof construction for a vehicle having an opening in its fixed roof comprises a frame with stationary guide rails extending on either side of the roof opening and operating mechanisms which are movable therein. Each operating mechanism comprises a driving slide which is connected to the panel of the open roof construction and which can come into engagement with a movable link slide so as to enable the sliding movement of the panel, in such a manner that said driving slide and said link slide move jointly during sliding movement of the closure element, and the driving slide moves relative to the substantially stationary link slide during movement in vertical direction of the closure element. The link slide includes a locking member for locking the link slide in position relative to the guide rail during movement in vertical direction of the panel. The driving slide and the link slide are provided with mating operating and coupling members for operating the locking member and coupling the driving slide and the link slide together during sliding movement of the panel. The operating and coupling member of the driving slide is formed on a part of the driving slide which is capable of movement parallel to the guide rail.

7 Claims, 5 Drawing Sheets

FOREIGN PATENT DOCUMENTS

| | | |
|---|---|---|
| DE | 4405742 C1 | 5/1995 |
| DE | 195 14 585 | 10/1996 |
| EP | 0033816 A1 | 8/1981 |
| EP | 0 143 589 | 5/1985 |
| EP | 0 218 890 | 4/1987 |
| EP | 0343750 A1 | 11/1989 |
| EP | 0517318 A1 | 9/1992 |
| EP | 0747249 A1 | 11/1996 |
| EP | 0899140 A1 | 3/1999 |
| FR | 2 495 068 | 4/1982 |
| FR | 2 527 995 | 9/1983 |
| JP | 0278422 | 9/1986 |
| JP | 0104734 | 1/1991 |
| JP | 404297323 | 10/1992 |

\* cited by examiner

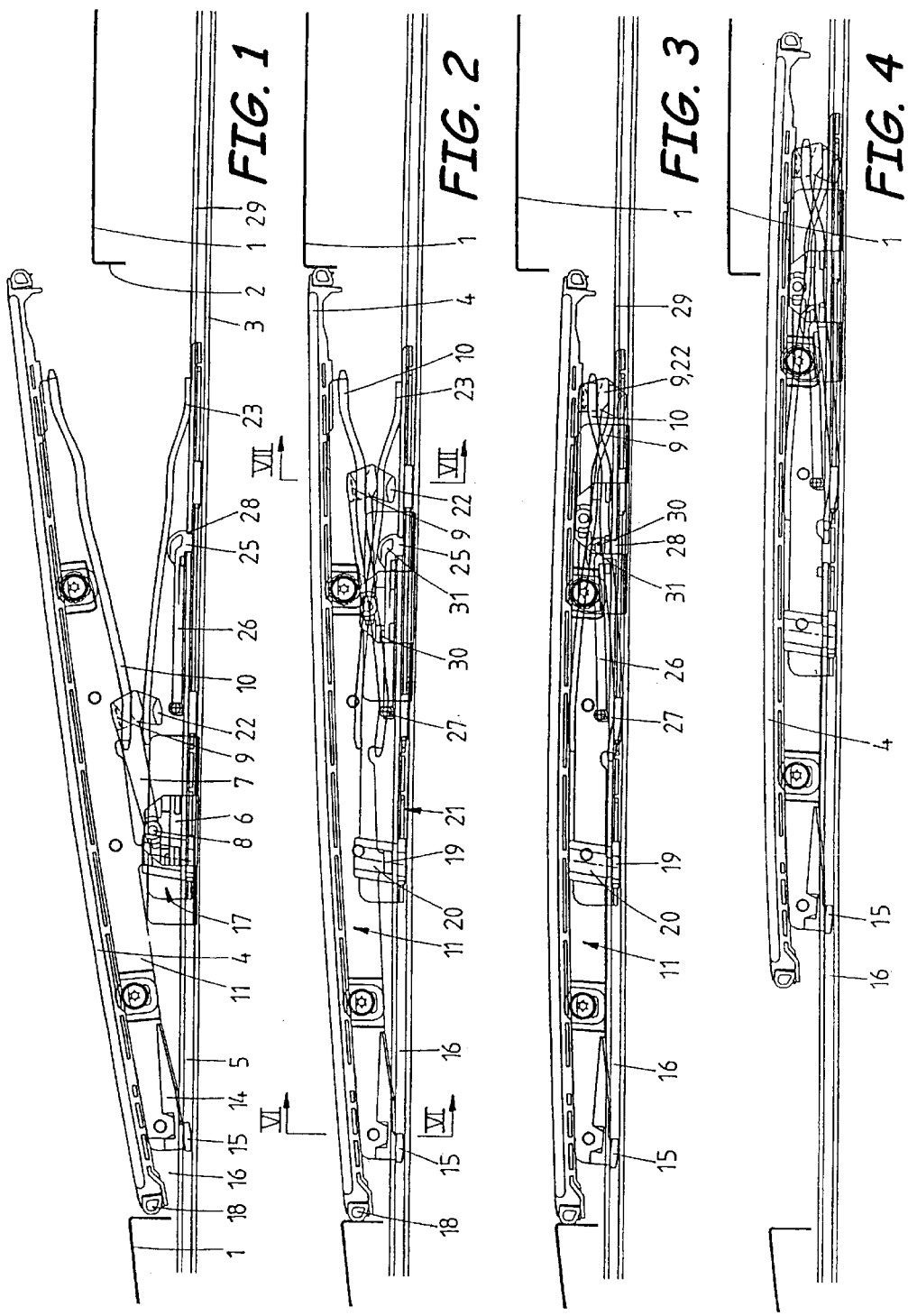

OPEN ROOF CONSTRUCTION FOR A VEHICLE

BACKGROUND OF THE INVENTION

The invention relates to an open roof construction having a roof opening in a fixed roof.

In an open roof construction which is known from the prior art, the operating and coupling member of the driving slide is provided on the guide pin, which moves through the guide slot in the closure element.

The object of the present invention is to further improve this prior art open roof construction.

SUMMARY OF THE INVENTION

According to the invention this objective is accomplished in that the operating and coupling member of the driving slide is formed on a part of the driving slide that is capable of movement in a direction parallel to the guide rail.

This minimizes the risk of incorrect engagement by the operating and coupling members of the driving slide and the link slide, because the operating and coupling member of the driving slide moves in only one direction (parallel to the guide rail). Preferably, the operation of the locking member is constrained in both directions so that spring means are not required, which may lose their spring force with the passage of time or which may cause other problems.

It is advantageous when the locking recess is formed in a separate flange of the guide rail, which is present above the bottom thereof.

The advantage of this is that lubricants, which may be present in the guide rail, can no longer leak through a locking recess formed in the bottom of the guide rail.

BRIEF DESCRIPTION OF DRAWINGS

The invention will now be explained in more detail with reference to the drawing, which shows an exemplary embodiment of the open roof construction according to the invention.

FIGS. 1–4 are longitudinal schematic line diagrams of the exemplary embodiment of the open roof construction according to the invention.

DETAILED DESCRIPTION OF ILLUSTRATIVE EMBODIMENTS

Figure 5:
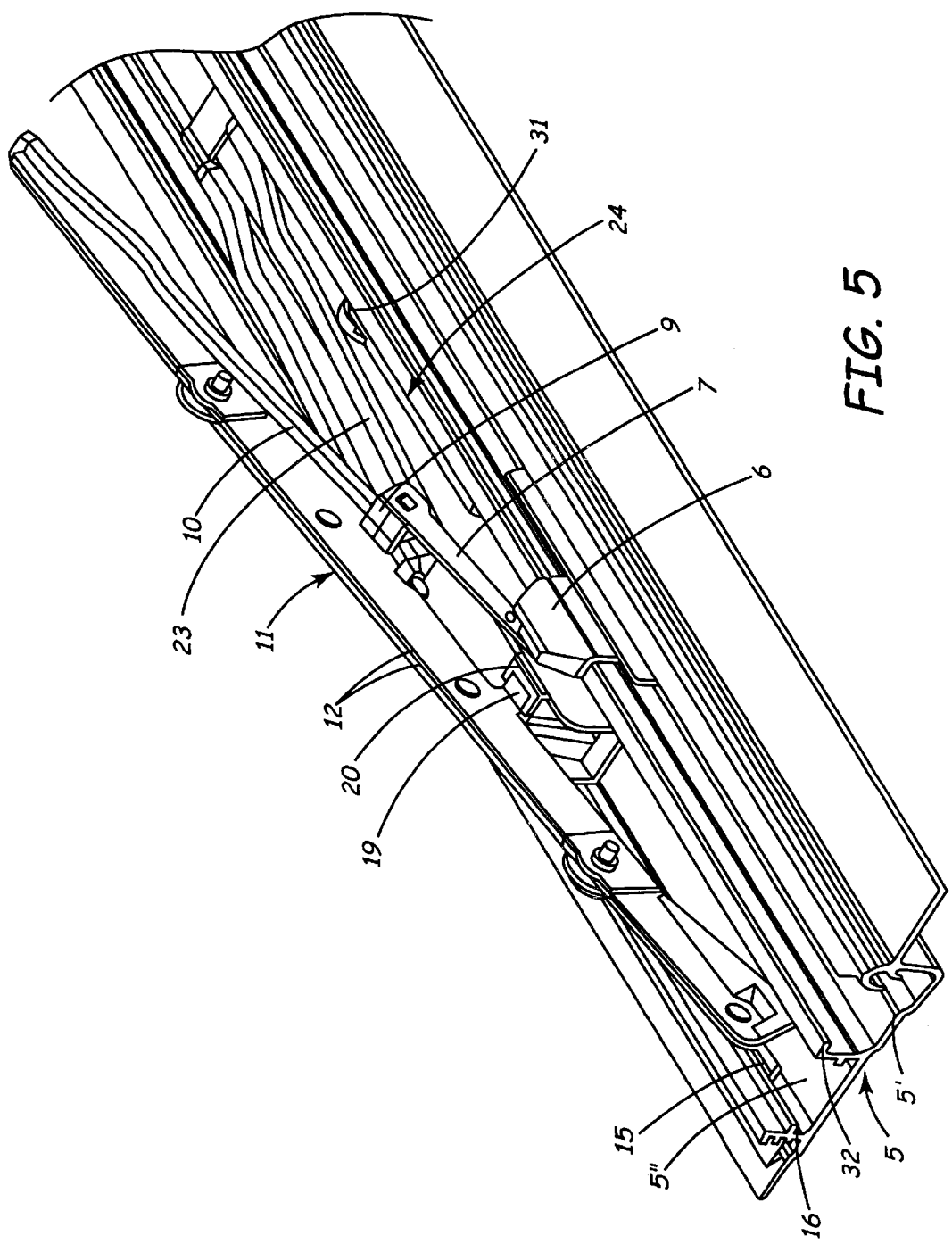
FIG. 5 is a perspective view of the main parts of the operating mechanism of the open roof construction of FIGS. 1–4.
Figure 6:
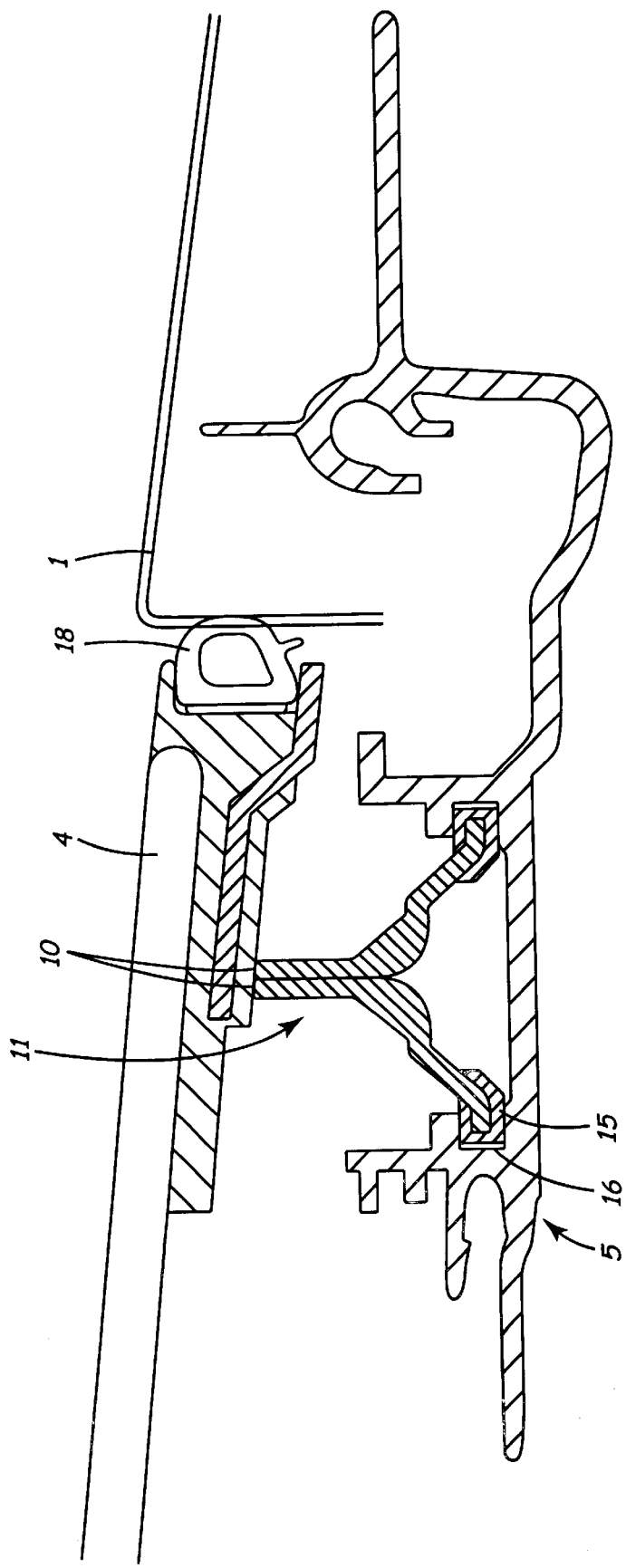
FIG. 6 is a larger-scale cross-sectional view along line VI—VI in FIG. 2.

The drawings, and in the first instance FIGS. 1–4, show an exemplary embodiment of the open roof construction according to the invention, which is built into a vehicle, such as a passenger car, the fixed roof 1 of which is provided with a roof opening 2. The open roof construction comprises a frame 3 or different stationary part, which can be attached to the fixed roof 1 or which is formed thereon. Said frame 3 supports, in a manner to be described in more detail hereafter, a closure element 4 which is capable of selectively closing the roof opening 2 or opening it at least partially.

In the illustrated embodiment, the open roof construction is a so-called sliding-tilt roof, wherein the closure element 4 is in the form of a transparent, rigid panel, which can be moved from the closed position in roof opening 2 (FIG. 2) to an upwardly sloping ventilating position (FIG. 1) on the one hand, and downwards (FIG. 3) and subsequently rearwards to a position under the fixed roof 1 (FIG. 4) on the other hand.

In order to enable these movements, panel 4 is fitted with an operating mechanism at both longitudinal edges, one of which is shown in the drawings, whereby it should be considered, however, that the same operating mechanism is present at the other longitudinal edge of panel 4 in mirror image thereof. Said operating mechanisms are disposed in guide rails 5, which are mounted in frame 3 or integrated therein and which extend on either side of the roof opening 2 and rearwards thereof under fixed roof 1. Each operating mechanism is actuated by a driving slide 6, which is guided in the associated guide rail 5 and which can be moved along guide rail 5 by means of a pull-push cable (not shown) or other connecting element which is connected to a drive unit such as an electric motor, a cranked handle or the like.

As is also clearly shown in FIG. 5, a vertically adjustable member in the form of an arm 7 is attached to the driving slide 6, which arm 7 is connected to the driving slide 6 by means of a horizontal, transversely extending pivot 8. The arm 7 of driving slide 6 includes a first guide member 9 in the form of a double guide cam, which is in engagement with a guideway 10 in the form of a rib projecting in transverse direction. The rib is formed on a link plate 11, which is mounted on the underside of panel 4 and which extends in the longitudinal direction thereof.

Figure 7:
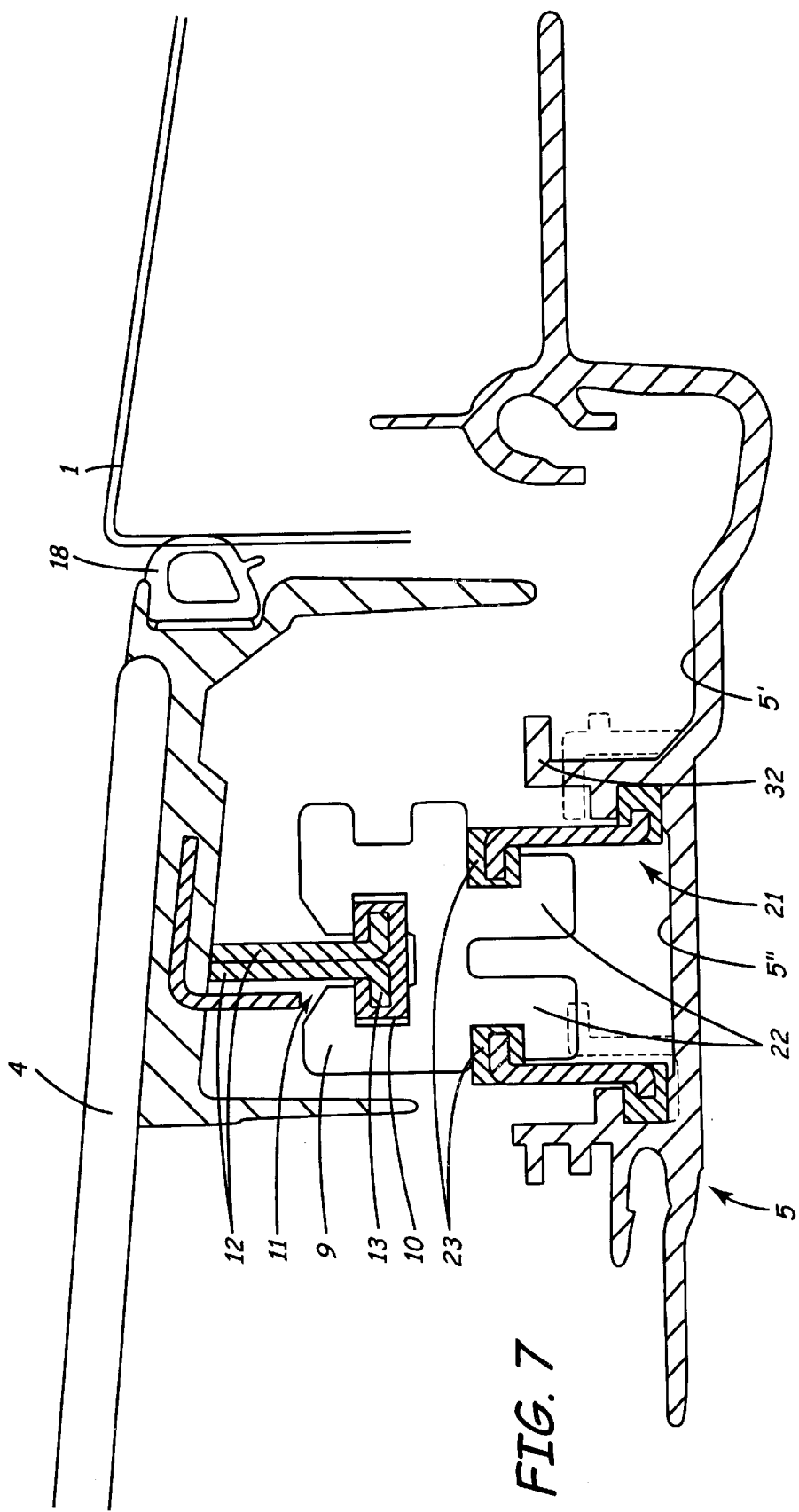
FIG. 7 is a larger scale cross-sectional view along line VII—VII in FIG. 2.
Figure 8:
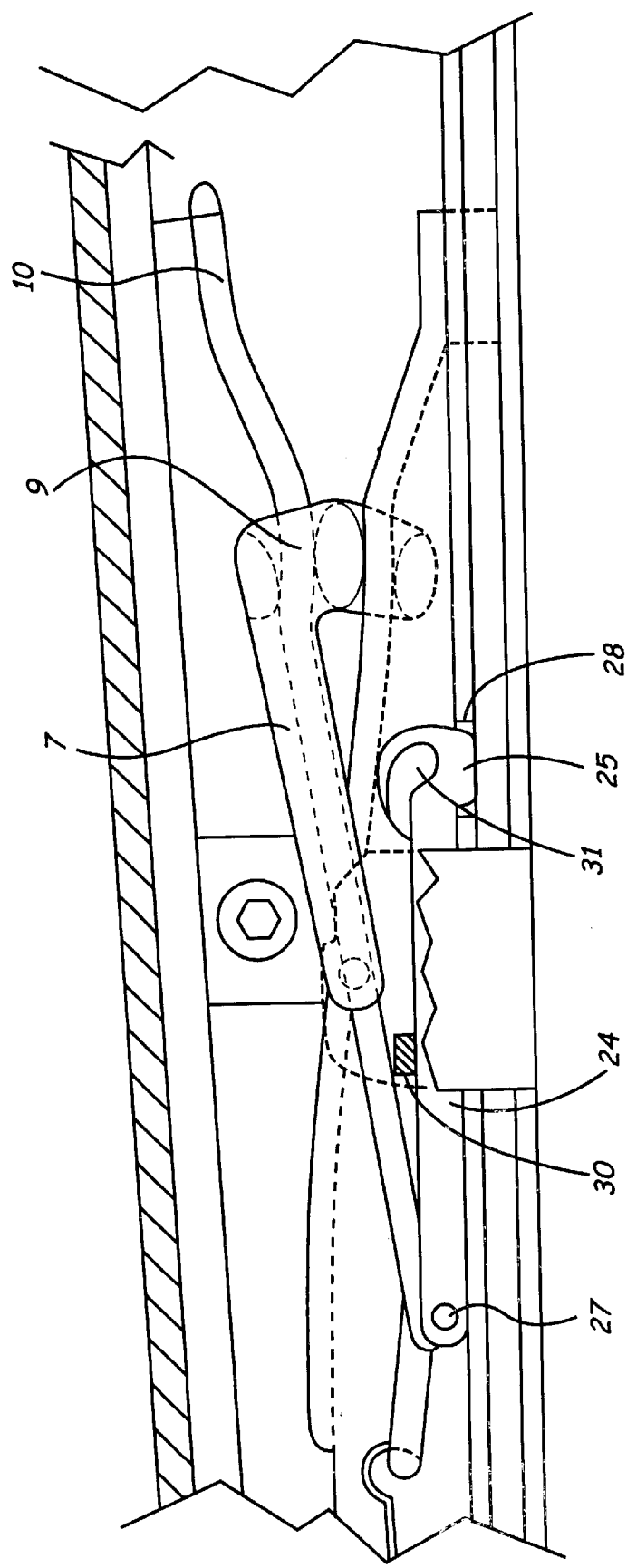
FIG. 8 is a larger scale view of a portion of FIG. 2.

As is shown in FIGS. 5 and 7, link plate 11 is formed of two abutting metal plates 12 or the like, which are each other's mirror image and on each of which various parts of the operating mechanism are formed in mirror image of each other. This also applies to guideway 10, which is formed on either side of link plate 11 by moulding plastic material on laterally projecting flanges 13 of the metal plates 12 (see FIG. 7).

On the front side, the metal plates 12 of the link plate 11 widely diverge, forming legs 14, on the lower ends of which sliding shoes 15 are moulded. The sliding shoes 15 are accommodated in associated grooves 16 of the guide rail 5 and are formed such that they are not only capable of sliding movement but also allow rotation about a transverse axis, so that the sliding shoes 15 at the same time serve as pivots. This leads to a reduction of the number of parts. Construction and connection of the link plate 11 to the panel 4 does not form part of the present invention, but is described in co-pending application entitled "Open Roof Construction for a Vehicle", Ser. No. 09/556,110, filed on even date herewith, which is incorporated herein by reference in its entirety.

Disposed some distance behind the front sliding shoes is a correction mechanism 17, which causes panel 4 to move slightly rearwards upon pivoting from the closed position, which is shown in FIG. 2, to the ventilating position, which is shown in FIG. 1, so as to detach a seal 18 on the front side of panel 4 from the edge of the fixed roof 1. This prevents said seal 18 from being exposed to high shearing forces upon being moved downwards slightly due to the pivoting movement of panel 4. Said correction mechanism 17 comprises cams 19 formed on both metal plates 12 of link plate 11, which cams 19 are in engagement with camways 20 formed on a link slide 21, which will be explained in more detail yet. The link slide 21 remains stationary during pivoting movement of panel 4 and moves along when the panel moves in the longitudinal direction of guide rail 5, so that cams 19 and camways 20 can remain in constant engagement with each other because cars 19 allow rearward movement of panel 4 in a lowermost position in camways 20.

Said link slide 21 cooperates with the driving slide 6 in various manners. Driving slide 6 and link slide 21 are indeed guided in two separate, adjoining guideways 5' and 5" of guide rail 5, but driving slide 6 is guided along an upright flange 32 between the two guideways 5' and 5", and projects laterally into guideway 5". Besides first guide member 9, arm 7 of driving slide 6, which extends above guideway 5", also has a second guide member 22, likewise in the form of dual cams engaging round a second guideway 23 on link slide 21 Dual second guide members 22 and second guideways 23 are used again, wherein the guideways 23 are facing ribs between which the two twin cams of the second guide member 22 are positioned (see FIG. 7). The guideways 10 and 23 are substantially the same length, whilst they are furthermore disposed at least substantially above each other and exhibit approximately the same slope, albeit in opposite directions. The guideways 10 and 23 are so formed and positioned that they can at least partially overlap upon pivoting movement of link plate 11 under the influence of the movement of the first and the second guide member 9, 22 of arm 7 along guideway 10. The sliding block of the arm 7 in which the guide members 9 and 22 are formed is capable of transmitting forces being exerted on panel 4 directly to the link slide 21, as a result of which arm 7 is hardly loaded, if at all, and a very stable support of the panel 4 can be ensured. This effect is further enhanced by the dual construction of guide members 9, 22 and guideways 10, 23.

As already mentioned before, link plate 21 only moves so as to enable movement of panel 4 in the longitudinal direction. The link plate 21 must remain stationary during other movements of panel 4 in the vertical direction, and consequently driving slide 6 must move relative to link slide 21 in that case. When panel 4 moves in the longitudinal direction, driving slide 6 and link slide 21 move as one unit.

Special locking, coupling and operating means are provided for locking and releasing link slide 21. As is shown in the various figures, a locking and coupling member 24 is present on link slide 21. Said member 24 comprises a locking cam 25, which is formed on the rear end of an arm 26. The arm 26 is pivotally connected to link slide 21 by means of a horizontal transverse pivot. In the frontmost position of link slide 21 (and of panel 4), the locking cam 25 can come into engagement with a locking recess 28 in a horizontal flange 29 of guide rail 5. The locking and coupling member 24 can be directly actuated by driving slide 6, whereby link slide 21 and guide rail 5 can be interlocked or be released from each other whilst driving slide 6 and link slide 21 can be released from each other or be interlocked, respectively, simultaneously therewith. To this end an operating pin or cam 30 extending towards link slide 21 and projecting above guideway 5" is formed on driving slide 6, which can come into engagement with an operating and coupling slot 31 on locking and coupling member 24 at the location of the locking cam 25 on the free end of arm 26. Pin 30 slides over the upper side of arm 26 before engaging in slot 31, thus retaining the locking cam 24 in its position in locking recess 28. Slot 31 has an open front end with a horizontal entry portion and a downwardly sloping operating and coupling portion, which causes a locking cam 25 to move in vertical direction when the horizontally moving pin 30 passes through slot 31. When the locking cam 25 has moved out of recess 28 and link slide 21 has moved to the rear, the locking cam 25 will slide onto the horizontal flange 29 of guide rail 5, thus blocking a downward return movement of locking cam 25. This causes pin 30 to be retained in the sloping portion of slot 31 and effects a locking engagement between driving slide 6 and link slide 21. In order to have the transmission of forces between driving slide 6 and link slide 31 take place directly rather than via arm 26 and the transverse pivot, at least in rearward direction, another cam (not shown) may be formed on link slide 21, on which part of the driving slide 6 engages.

The operation of the illustrated embodiment of the open roof construction according to the invention is in principle similar to that of the embodiment described in Dutch patent application No. 1009773 (PCT WO 00/06403), which is incorporated herein by reference in its entirety.

From the foregoing it will be understood that the invention provides an open roof construction which is remarkable for its simplicity and for a reliably operating locking and coupling mechanism between the driving slide 6 and the link slide 21.

The invention is not restricted to the above-described embodiment as shown in the drawing, which can be varied in several ways without departing from the scope of the invention. Thus the invention can also be used with other kinds of open roof constructions such as tilt roofs, spoiler roofs and other types of roofs comprising panels or different single or multiple closure elements. Furthermore it is possible to use separate operating and coupling members rather than combined operating and coupling members.

The invention is not restricted to the above-described embodiment as shown in the drawing, which can be varied in several ways without departing from the scope of the invention.

What is claimed is:

1. An open roof construction for a vehicle having a roof opening in its fixed roof, comprising:

a stationary part to be fixed to the roof, said stationary part including guide rails for extending on either side of the roof opening and operating mechanisms which are movable therein, an adjustable closure element supported by said operating mechanisms, which is adjustable through a sliding movement and a movement in vertical direction between a closed position, for closing the roof opening, and an open position, for opening the roof opening at least partially, wherein each operating mechanism comprises a driving slide which is connected to the closure element and which can come into engagement with a movable link slide so as to enable a sliding movement of the closure element, in such a manner that said driving slide and said link slide move jointly during the sliding movement of the closure element, and said driving slide moves relative to the substantially stationary link slide during said movement in vertical direction of the closure element, wherein the link slide includes a locking member for locking the link slide in position relative to the guide rail during movement in vertical direction of the closure element, and said driving slide and said link slide are provided with mating operating and coupling members for operating the locking member and coupling the driving slide and the link slide together during sliding movement of the closure element, and wherein the operating and coupling member of the driving slide is formed on a part of the driving slide which is capable of movement parallel to the guide rail.

2. The open roof construction according to claim 1, wherein the locking member is a locking cam, which is in engagement with a locking recess in the guide rail in the frontmost position of the locking slide.

3. The open roof construction according to claim 2, wherein the locking recess is formed in a separate flange of the guide rail, which is present above the bottom thereof.

4. The open roof construction according to claim 2, wherein the locking cam of the link slide is formed on the free end of an arm which is pivotable about a horizontal transverse pivot.

5. The open roof construction according to claim 4, wherein the operating and coupling members of the driving slide and the link slide are provided with a pin and a slot, respectively wherein the slot includes a vertically extending part.

6. The open roof construction according to claim 1, wherein each guide rail includes two adjoining guideways, a first guideway for the driving slide (6) and a second guideway for the link slide.

7. The open roof construction according to claim 6, wherein the driving slide is guided by a flange disposed between the two guideways and projects into the second guideway of the link slide.

* * * * *